(12) United States Patent
Cella et al.

(10) Patent No.: US 8,074,947 B2
(45) Date of Patent: Dec. 13, 2011

(54) METHOD OF USING LONG-HANDED GARDEN TOOLS, EACH PROVIDED WITH A RECONFIGURABLE GARDEN TOOL CADDY DEVICE

(76) Inventors: James J. Cella, Danbury, CT (US); Steven G. Hansen, New Milford, CT (US)

( * ) Notice: Subject to any disclaimer, the term of this patent is extended or adjusted under 35 U.S.C. 154(b) by 1104 days.

(21) Appl. No.: 11/702,956

(22) Filed: Feb. 6, 2007

(65) Prior Publication Data

US 2008/0083681 A1    Apr. 10, 2008

Related U.S. Application Data

(63) Continuation-in-part of application No. 11/544,447, filed on Oct. 6, 2006.

(51) Int. Cl.
*A01B 1/00* (2006.01)
(52) U.S. Cl. .......... 248/146; 211/70.6; 254/131
(58) Field of Classification Search .......... 248/146, 248/150; 211/70.6, 70.8; 254/131, 131.5
See application file for complete search history.

(56) References Cited

U.S. PATENT DOCUMENTS

| | | | | |
|---|---|---|---|---|
| 270,624 A | * | 1/1883 | Barnett | 248/688 |
| 490,472 A | | 1/1893 | Clements | |
| 539,357 A | * | 5/1895 | Davis | 248/688 |
| 892,525 A | * | 7/1908 | Jorgensen | 248/688 |
| 1,008,104 A | | 11/1911 | Ball | |
| 1,182,139 A | * | 5/1916 | Brown | 248/688 |
| 1,362,177 A | | 12/1920 | Petrie | |
| 1,752,400 A | * | 4/1930 | Sund | 15/246 |
| 2,996,192 A | * | 8/1961 | Dell et al. | 211/49.1 |
| 4,358,123 A | * | 11/1982 | Richards | 280/47.131 |
| 5,161,772 A | | 11/1992 | DiResta et al. | |
| 5,868,374 A | | 2/1999 | Lomando | |
| 6,530,487 B1 | * | 3/2003 | Berry | 211/70.6 |
| 6,681,940 B1 | * | 1/2004 | Cash et al. | 211/70.6 |
| 6,755,311 B2 | * | 6/2004 | Berry | 211/70.6 |

* cited by examiner

*Primary Examiner* — Terrell McKinnon
*Assistant Examiner* — Steven Marsh
(74) *Attorney, Agent, or Firm* — Thomas J. Perkowski, Esq., P.C.

(57) ABSTRACT

A reconfigurable garden tool caddy device that is adapted for mounting to the handle portion of a long-handled garden tool, so as to provide the so equipped garden tool with two primary configurations of operation, namely: (i) a self-standing configuration, wherein its stand portion is arranged at a first angle with respect to the handle portion of the long-handled garden tool and supports the garden tool in an upright position at a second angle formed with respect to the ground surface of the garden; and (ii) a transport-work configuration, wherein the stand portion is disposed closely adjacent the handle portion of the garden tool and is releasably retained by a stand retainer structure so that the adapted garden tool can be transported between the garden and a tool shed or like shelter where garden tools are kept from the natural elements when not being used to work the soil of a garden.

2 Claims, 20 Drawing Sheets

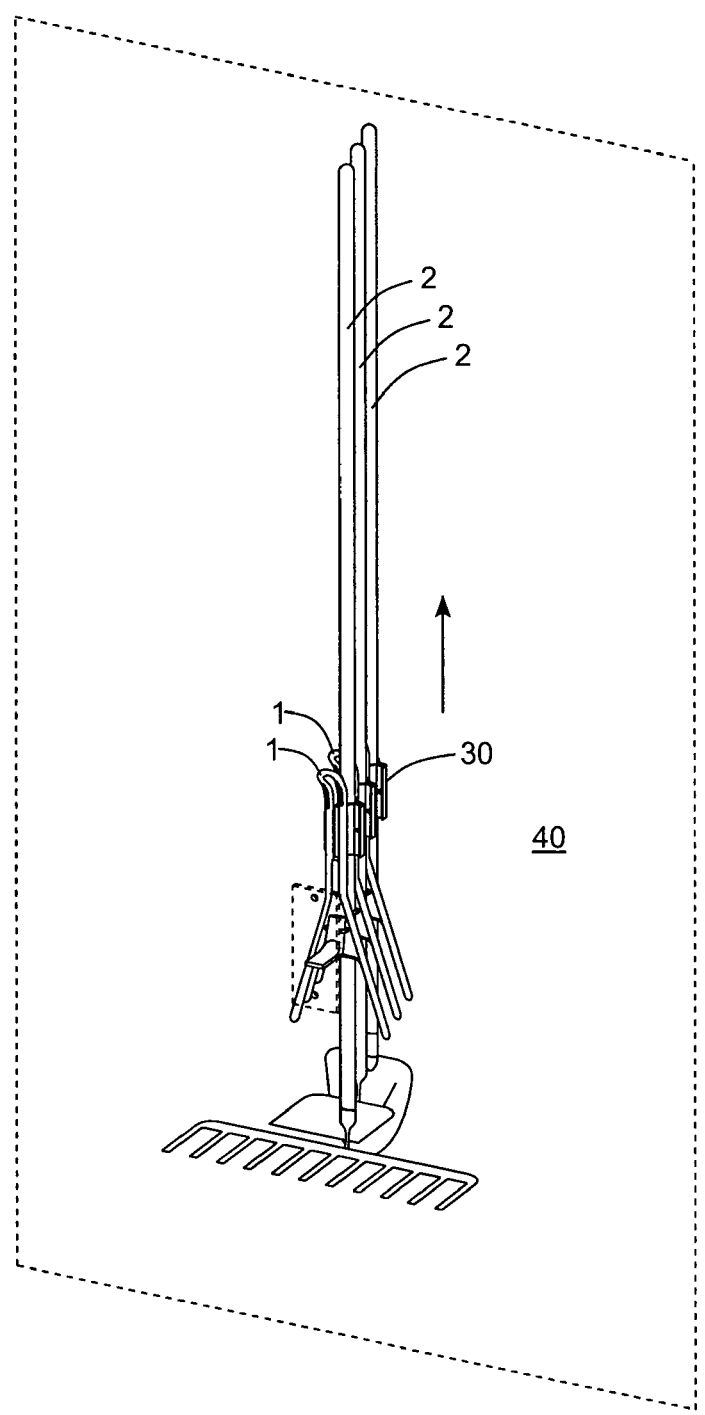
FIG. 16A1

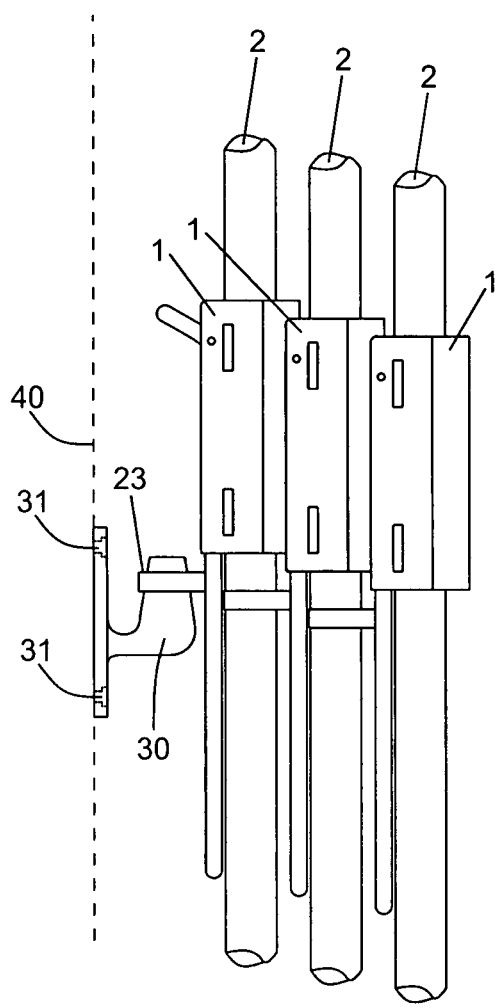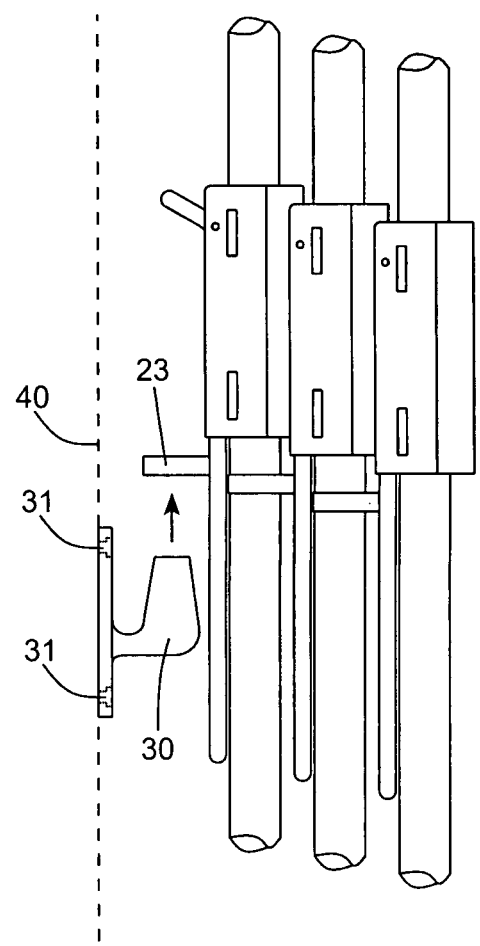
FIG. 16A2   FIG. 16A3

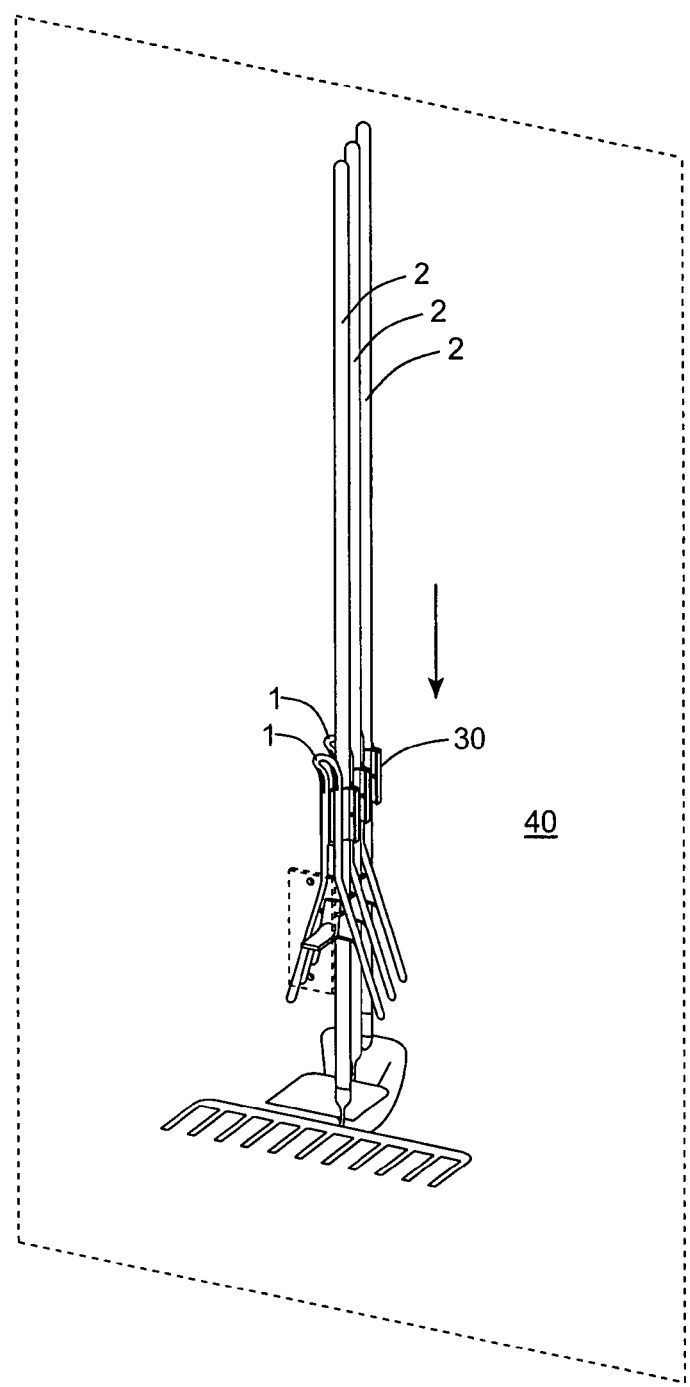
FIG. 16E1

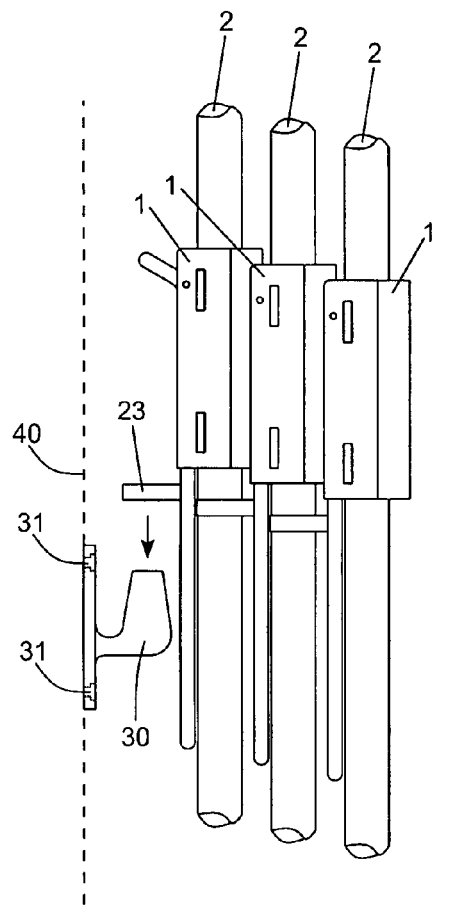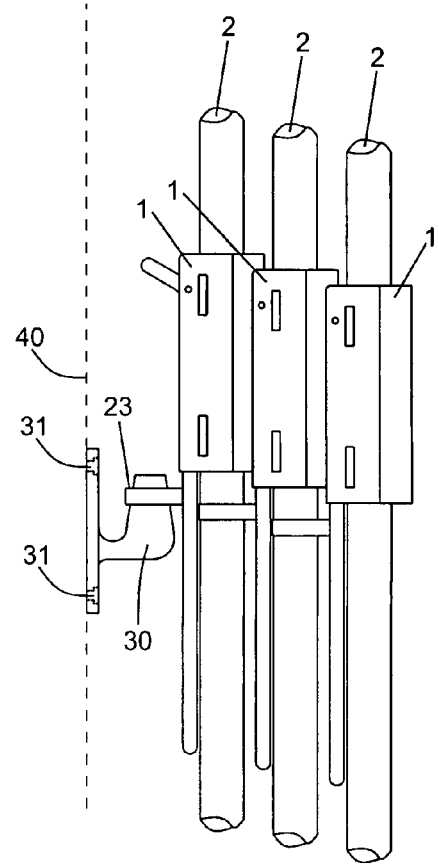
FIG. 16E2  FIG. 16E3

METHOD OF USING LONG-HANDED GARDEN TOOLS, EACH PROVIDED WITH A RECONFIGURABLE GARDEN TOOL CADDY DEVICE

RELATED CASES

The present Application is a Continuation-in-Part (CIP) of U.S. patent application Ser. No. 11/544,447 filed Oct. 6, 2006, which is incorporated herein by reference as if set forth fully herein.

BACKGROUND OF INVENTION

1. Field of Invention

The present invention relates to improvements in apparatus for organizing and transporting garden tools, such as rakes, hoes and other long-handled tools and articles, from a garage or storage shed, to a remote garden location, and enabling the garden tools to stand in a safe, upright position when not in use at the garden location.

2. Brief Description of the State of Knowledge in the Art

For centuries, man has enjoyed working in gardens using long-handled garden tools, such as garden rakes, hoes, shovels, and the like.

Until recently, such long-handled garden tools would be placed on the ground when not in use, allowing for someone to either step on the tools, or trip thereover and run the risk of injury. In recent years, this problem has been addressed in a number of US Patents.

In U.S. Pat. No. 6,755,311, Berry addressed this problem by disclosing a portable stand for storing long-handled garden tools in a garden location. The tools are removed from the stand prior to use in landscaping. The stand is compact and permits a plurality of garden tools to be stored in close proximity to one another. The distal end of a garden tool is slidably received by a sleeve formed in the stand, which is shaped to contact the distal end of the tool and maintain the tool in a substantially vertical orientation while permitting the tool to generate a force which forces the stand against the ground. However, this portable stand does not enable the convenient transportation of long-handled garden tools from the storage shed or garage to the garden area which can be a significant distance in some situations, and apparently lends itself to a semi-permanent installation in the garden.

In U.S. Pat. No. 5,868,374, Lomando discloses a push broom stand which is installed onto the second end of the broom handle of a push broom to thereby support the push broom in an upright position when the broom is not in use. The push broom stand is also configured to be able to hang the broom from an elevated surface. However, like U.S. Pat. No. 6,755,311, Lomando's portable broom stand is limited to push broom applications, is not adapted for the soil conditions in typical gardens, and does not enable the convenient transportation of long-handled garden tools between a storage shed and a garden area.

In U.S. Pat. No. 5,161,772, DiResta et al discloses a stand for push brooms and like implements, which is adapted to be attached to a long-handled implement, such as a push broom, a mop, a rake, a floor squeegee and the like. The stand holds an implement, when it is not being used, on a supporting surface with the handle in a substantial vertical position where it can be quickly grasped for use of the same. The stand includes a leg which may be mounted on the implement handle or on the front end of a part of the body of the implement. The stand leg may be integrally formed with a part of the body of the implement. The stand leg may be adjustably mounted on the implement handle. Similarly, this portable broom stand is not adapted for the soil conditions found in typical gardens, and does not enable the convenient transportation of long-handled garden tools between a storage shed and a garden area.

Indeed, while the above prior art patents address the problems of organizing and storing long-handled garden tools, as well as storing and standing push brooms in indoor environments, the prior art, when taken as a whole, fails to satisfy the problems of the modern gardener, in a simple and convenient manner, who typically needs to transport several garden tools at one time, to and from the garden, along with other garden tools and accessories.

Thus, there is a great need in the art for improved apparatus having enhanced functionalities and performance characteristics that translate into a better product offering and value proposition for both consumers and garden tool manufacturers alike.

OBJECTS AND SUMMARY OF THE INVENTION

Accordingly, it is a primary object of the present invention to provide improved apparatus for organizing and transporting one or more long-handled garden tools to and from garden locations, while enabling the self-standing of such garden tools in an upright position when not in use, while avoiding the shortcomings and drawbacks of the prior art apparatus heretofore known.

Another object of the present invention is to provide such apparatus in the form of a novel reconfigurable garden tool caddy device for conveniently supporting and transporting one or more long-handled garden tools to and from remote garden locations, and enabling the self-standing of such garden tools in an upright position in the garden when not in use.

Another object of the present invention is to provide such a reconfigurable garden tool caddy device that is adapted for mounting to the handle portion of a long-handled garden tool, so as to provide the so equipped garden tool with two primary configurations of operation, namely: (i) a self-standing configuration, wherein its stand portion is arranged at a first angle with respect to the handle portion of the long-handled garden tool and supports the garden tool in an upright position at a second angle formed with respect to the ground surface of the garden; and (ii) a transport-work configuration, wherein the stand portion is disposed closely adjacent the handle portion of the garden tool and is releasably retained by a stand retainer so that the adapted garden tool can be transported between the garden and a tool shed or like shelter where garden tools are typically kept from the natural elements when not being used.

Another object of the present invention is to provide such a reconfigurable garden tool caddy device, wherein the first angle is a first acute angle, and the second angle is a second acute angle.

Another object of the present invention is to provide such a reconfigurable garden tool caddy device, wherein the first angle is an acute angle, and the second angle is an obtuse angle.

Another object of the present invention is to provide such a reconfigurable garden tool caddy device, wherein its stand portion is formed as a unitary structure (e.g. made from forged or die-cast metal or molded plastic material) and hingedly connected to the stand retainer provided on the mounting assembly by way of a pivot pin, so that the stand portion rotates about the pivot pin supported within the stand retainer.

Another object of the present invention is to provide such a reconfigurable garden tool caddy device, wherein the mounting assembly comprises first and second mounting portions, embracing opposite sides of the handle portion of a garden tool (e.g. along its mid-section) and interconnecting with releasably secured together, with the garden tool handle held securely therebetween, thereby preventing the device from rotating about or sliding along the garden tool handle.

Another object of the present invention is to provide such a reconfigurable garden tool caddy device, wherein the stand retainer snap-fits into a slot formed in the stand portion during the transport-work configuration.

Another object of the present invention is to provide such a reconfigurable garden tool caddy device, wherein the stand portion includes an end structure having semi-circular geometry and being particularly adapted to engage with and support against the handle portion of the garden tool, slightly beyond the mounting position of the mounting assembly along the garden tool handle, when the adapted or device-equipped garden tool is arranged in its self-standing configuration.

Another object of the present invention is to provide such a reconfigurable garden tool caddy device, wherein during the self-standing configuration, the plane of the stand portion is arranged at an acute angle with respect to the axis of the handle portion of the garden tool, and the angular spread of the support portion provides a high degree of stability when the adapted or device-equipped garden tool of the present invention is supported on a rugged garden soil surface while configured in the self-standing configuration.

Another object of the present invention is to provide a reconfigurable garden tool caddy device, wherein both sides of its first mounting portion are provided with plural projections on their inner edge surfaces and are adapted to be releasably engaged with plural corresponding grooves formed on the outer edge surface of both sides of the second mounting portion when the first mounting portion is pressed downward with a garden tool handle disposed between the first and second mounting portions, thereby accommodating garden tool handles having small as well as large shaft diameters.

Another object of the present invention is to provide a reconfigurable garden tool caddy device, wherein one side of its first and second mounting portions are hingedly connected together (e.g. by way of integral molding, mechanical hinges or like connection measures), while the other side of the first and second mounting portions are provided with plural projections on its inner edge surface and are adapted to be releasably engaged with plural corresponding grooves formed on the outer edge surface of the second mounting portion when the first portion is pressed downward with a garden tool handle disposed between the first and second mounting portion halves, thereby accommodating garden tool handles having small as well as large shaft diameters.

Another object of the present invention is to provide such a reconfigurable garden tool caddy device, wherein the mounting assembly and/or stand portion (and its enabling structure) are provided with multiple clips and mounting structures for securely holding a small hand tool (e.g. trowel or hand hoe), a MP3 music player, a miniature AM/FM radio, a water bottle, and other small articles which gardeners frequency carry with them to the garden.

Another object of the present invention is to provide a novel garden tool caddy system, which is capable of stacking together plural garden tools that are each provided with the reconfigurable garden tool caddy device of the present invention, and can be simply bundled together, as a single hand-transportable unit, during the transport-work configuration.

Another object of the present invention is to provide such a garden tool caddy system, wherein each garden tool is provided with a reconfigurable garden tool caddy device having a handle clasping structure formed on the stand portion thereof, for securely and releasably clasping the handle portion of another different garden tool.

Another object of the present invention is to provide such a garden tool caddy system, wherein the handle clasping structure of each reconfigurable garden tool caddy device has resilient properties to clasp the handle of any long-handled garden tool with sufficient strength that the tools will he held together as a single transportable unit, during the transport-work configuration, and yet be easily detachable to permit usage of the garden tool during gardening (i.e. working) operations.

Another object of the present invention is to provide a novel method of using a plurality of otherwise cumbersome long-handled garden tools during gardening operations.

Another object of the present invention is to provide such a method, wherein each long-handled garden tool is adapted to form part of a reconfigurable garden tool caddy system, and can be conveniently stored, as a single hand-transportable unit, on the wall surface of a garage, tool shed or other storage shelter.

Another object of the present invention is to provide such a method, wherein when the garden tools are to be used in the garden, the caddy system can be simply dismounted within seconds and toted across the yard in hand or aboard a wheelbarrow, and into the garden where the system is quickly disassembled into its individual garden tool components, each of which has a self-standing configuration, and can function as a separate caddy, in accordance with the principles of the present invention.

Another object of the present invention is to provide such a method, wherein finally, when gardening activities are done, the individual garden tool components can be quickly snapped together to form the garden tool caddy system which, as a single hand-transportable unit, can be simply toted back across the yard, in ones hand or in a wheelbarrow, to the garage, tool shed or storage shelter, as the case may be, where the garden tool caddy system can be remounted on the wall surface, as a single hand-transportable unit, within seconds, for convenient storage.

Another object of the present invention is to provide such a reconfigurable garden tool caddy device that can support and/or bear ornamental structures and/or designs to resemble wildlife and other animal forms for the amusement and pleasure of gardeners and spectators alike.

Yet a further object of the present invention is to provide a novel long-handled garden tool having two primary configurations of operation, namely: (i) a self-standing configuration, wherein the stand portion is arranged at an angle with respect to the handle portion of said long-handled garden tool and supports the garden tool in an upright position at an acute angle formed with respect to the ground surface of the garden; and (ii) a transport-work configuration, wherein its stand portion is disposed closely adjacent the handle portion of the garden tool and is releasably retained by a stand retainer structure so that the adapted garden tool can be transported between the garden and a tool shed or like shelter where garden tools are kept from the natural elements when not being used to work the soil of a garden.

Another object of the present invention is to provide a class or group of a long-handled garden tools that are capable of being stacked and releasably held together, as a single hand-transportable unit during transportation, and which are capable of self-standing during the self-standing configuration of such garden tools.

These and other objects of the present invention will become apparent hereinafter, and in the claims to invention appended hereto.

BRIEF DESCRIPTION OF THE DRAWINGS

In order to more fully understand the nature and objects of the present invention, reference should be made to the following Detailed Description of the Illustrative Embodiments which should be read in conjunction with the appended figure Drawings, wherein:

FIG. 16A1 is a perspective view of the garden tool caddy system of the present invention, illustrated in FIG. 14, shown stacked and bundled together, and releasably mounted against and on the vertical wall surface of a garage, tool shed or other shelter, by way of a support post mounted on the wall surface by screws or other fastening mechanism;

FIG. 16A2 is an elevated side view of the garden tool caddy system illustrated in FIG. 16A1, showing the clasping hook of the garden tool, closest to the wall surface, releasably engaging and being supported by the support post mounted on the wall surface;

FIG. 16A3 is an elevated side view of the garden tool caddy system illustrated in FIGS. 16A1 and 16A3, showing the clasping hook of the garden tool, closest to the wall surface, being lifted off and disengaging from the support post mounted on the wall surface;

FIG. 16E1 is a perspective view of the garden tool caddy system illustrated in FIGS. 16A1 through 16D, shown supported once again back against the wall surface of the garage, storage shed or shelter, by way of the support post mounted on the wall surface;

FIG. 16E2 is an elevated side view of the stored garden tool caddy system illustrated in FIG. 16E1, showing the clasping hook of the garden tool, closest to the wall surface, releasably engaging and being supported by the support post mounted on the wall surface; and FIG. 16E3 is an elevated side view of the garden tool caddy system illustrated in FIGS. 16E1 and 16E2, shown securely supported on the support post mounted on the wall surface.

DETAILED DESCRIPTION OF ILLUSTRATIVE EMBODIMENTS OF THE PRESENT INVENTION

Referring now to the figures in the accompanying Drawings, the illustrative embodiments of the present invention will now be described in great technical detail below, wherein like parts and components are indicated by like reference numbers.

As shown in the illustrative embodiments, the reconfigurable garden tool caddy device of the present invention 1 is designed for quick and simple attachment to the handle portion of any long-handled garden tool 3 (e.g. hoe, rake, shovel, etc.) regardless of its shaft diameter, so as to provide a garden tool with enhanced functionalities and performance characteristics. However, it is understood that the reconfigurable garden tool caddy device of the present invention may be integrated into any such garden tool at the time of its design and manufacture.

Figure 1:
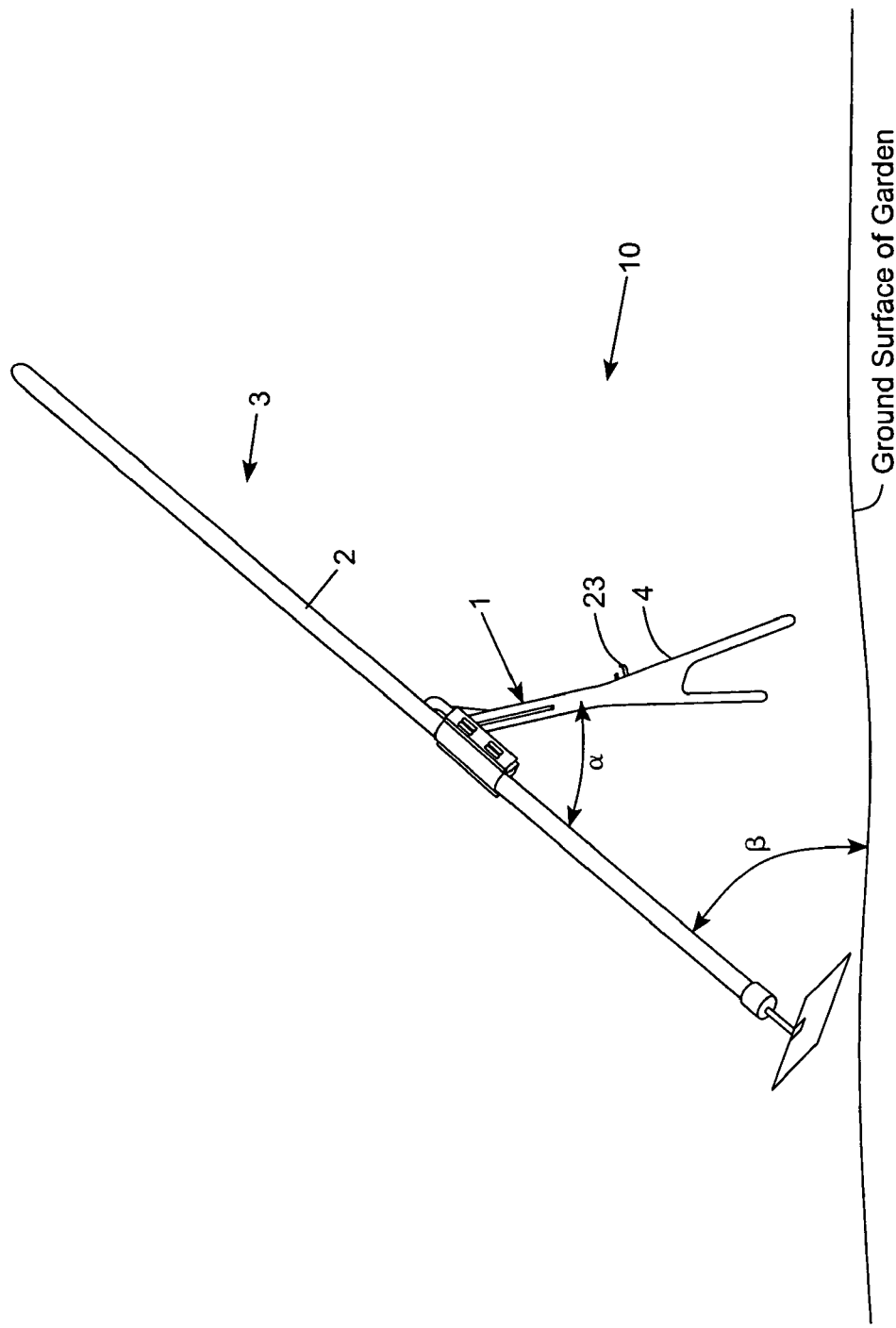
FIG. 1 is a first perspective view of the reconfigurable garden tool caddy device of the illustrative embodiment of the present invention, shown mounted on a long-handled garden tool and arranged so that the garden is configured in its self-standing configuration on the ground surface of a garden.

In general, the reconfigurable garden tool caddy device 1 of the present invention is designed for mounting to and/or integration with a long-handled garden tool so as to provide the so equipped garden tool with two primary configurations, namely: (i) a self-standing configuration, as shown in FIGS. 1, 2 and 3, wherein the stand portion 4 is arranged at an angle α with respect to the handle portion 2 of the long-handled garden tool and supports the garden tool in an upright position at an acute angle β formed with respect to the ground surface of the garden; and (ii) a transport-work configuration, as shown in FIGS. 4, 5, 6 and 7, wherein its stand portion is disposed closely adjacent the handle portion of the garden tool and is releasably retained by a stand retainer 5 so that the adapted garden tool can be transported between the garden and a tool shed or like shelter where garden tools are kept from the natural elements when not being used to work the soil of a garden.

Notably the angle α between the principal plane of stand portion 4 of the device and central axis of the handle portion 2 of the garden tool is an acute angle in the first illustrative embodiment. However, it is understood that in alternative embodiments, the stand portion and its mounting assembly can be designed and arranged so that the angle (α) between the principal plane of the stand portion and the central axis of the handle portion is an obtuse angle, while the angle of inclination of the handle portion of the adapted garden tool with respect to the ground surface remains with the range of an acute angle, as would be desired in most applications.

Figure 8:
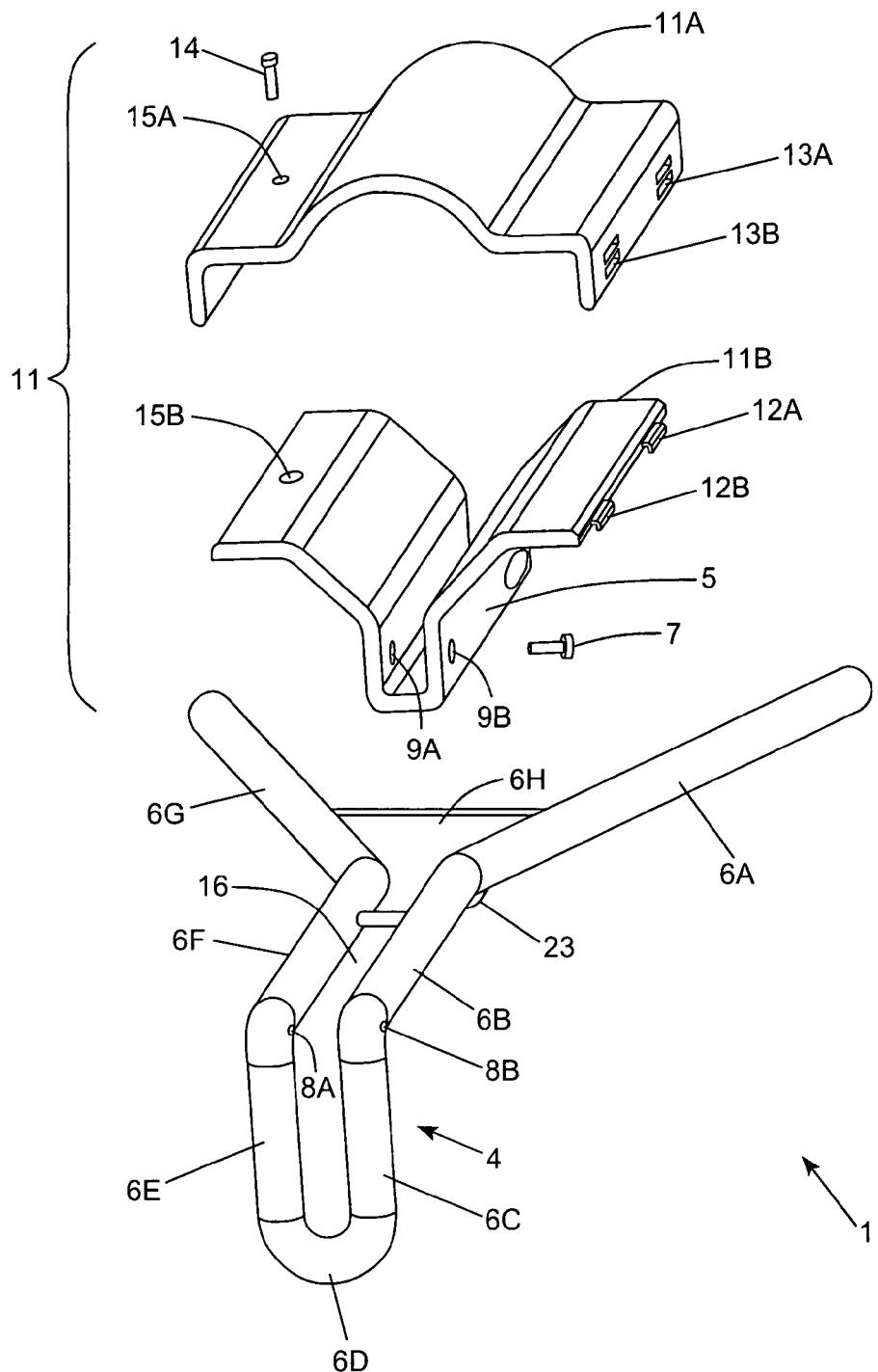
FIG. 8 is an exploded perspective diagram showing the various components of the reconfigurable garden tool caddy device of the first illustrative embodiment of the present invention, disassembled and removed from the handle portion of a long-handled garden tool, and comprising a stand portion hingedly connected to the mounting assembly by way of a pivot pin or like structure, and fastened to the handle portion of a long-handled garden tool by way of the first and second mounting portions of the mounting assembly that embraces the handle portion of the garden tool.

As shown in FIG. 8, the reconfigurable garden tool caddy device 1 of the first illustrative embodiment of the present invention comprises: stand portion 4 having tubular sections 6A, 6B, 6C, 6D, 6E, 6F, and 6G which are continuously joined together as a unitary structure (e.g. made from forged or die-cast metal or molded plastic material) and hingedly connected to the stand retainer 5 (provided on mounting assembly 11) by way of a pivot pin 7. As shown, a planar support plate 6H extends across and bridges the space between sections 6A and 6G and provides a planar support surface for providing clips and holding mechanisms for releasably/detachably holding garden accessories (e.g. a small hand tool such a trowel or hand hoe, a MP3 music player, a miniature AM/FM radio, and/or small water bottle). When the device is mounted on the handle of a garden tool, the pivot pin 7 is passed through (i) holes 8A and 8B formed through tubular sections 6B and 6F respectively, as well as (ii) a holes 9A and 9B formed through the stand retainer 5, as shown, so that the stand portion 4 rotates about the pivot pin 7 within the stand retainer 5. In the illustrative embodiment of the present invention, the mounting assembly 11 comprises first and second mounting portions 11A and 11B embracing opposite sides of the handle portion 2 of a garden tool (e.g. along its mid-section) and interconnecting with each other on one side by way of a pair of flanges 12A and 12B formed on the side edge of the second mounting portion 11B (which has a pseudo-V-like cross-section for receiving the handle portion 2 of the garden tool). The flanges 12A and 12B pass through mated slots 13A and 13B formed on the corresponding side of the first mounting portion 11A. A fastening screw 14 passes through a hole 15A formed in the opposite side of the first mounting portion 11A and into a threaded hole 15B formed in the corresponding side of the second mounting portion 11B, as shown in FIG. 8, so as to releasably secure together the first and second mounting portions 11A and 11B, with the garden tool handle 2 held securely therebetween, thereby preventing the device of the present invention from rotating about or sliding along the garden tool handle 2.

Figure 2:
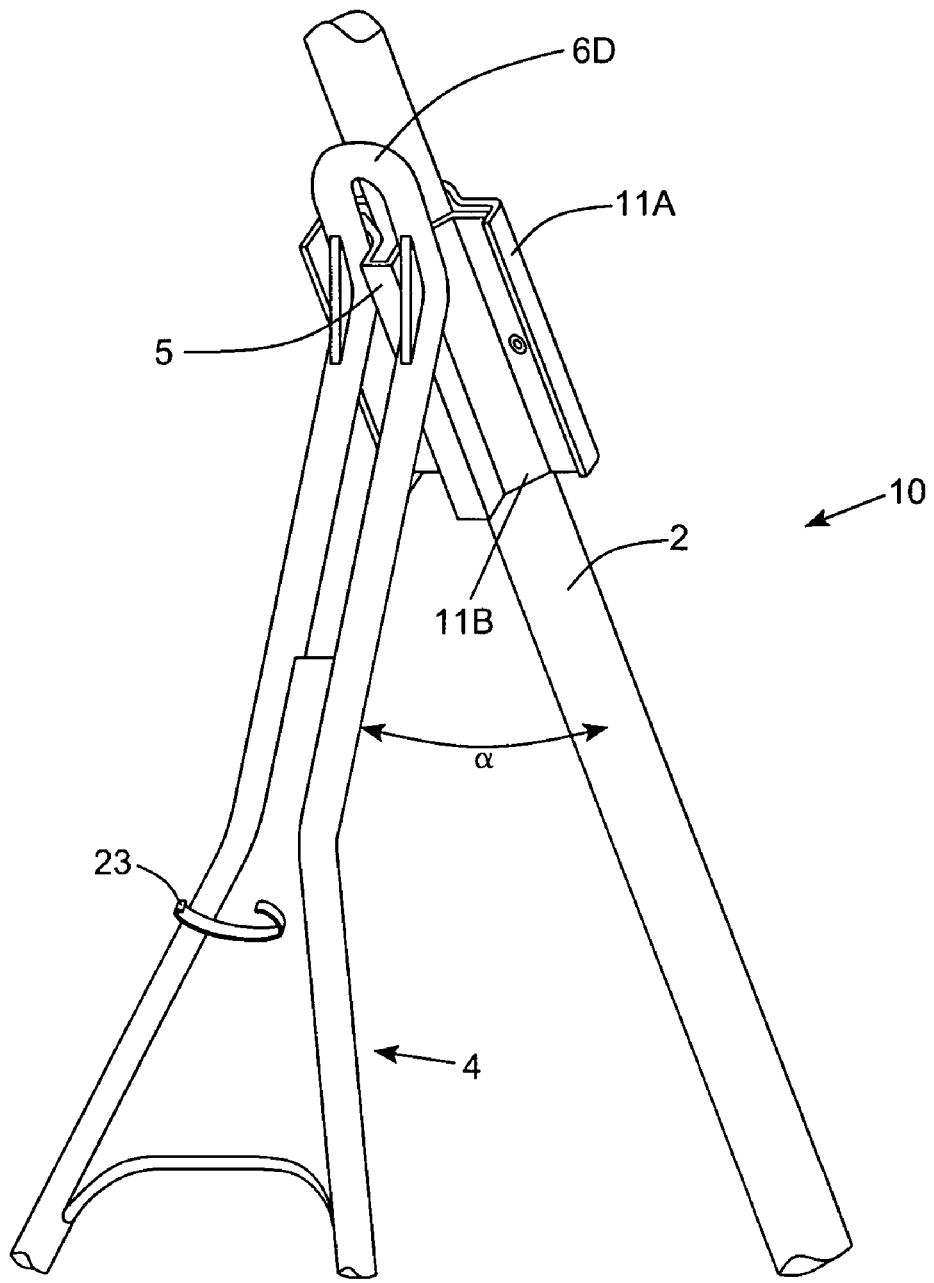
FIG. 2 is a second perspective, partially cut-away view of the reconfigurable garden tool caddy device of FIG. 1, showing its hinged stand portion protracted away from the mounting assembly mounted about the mid-section of the handle portion of the garden tool.
Figure 3:
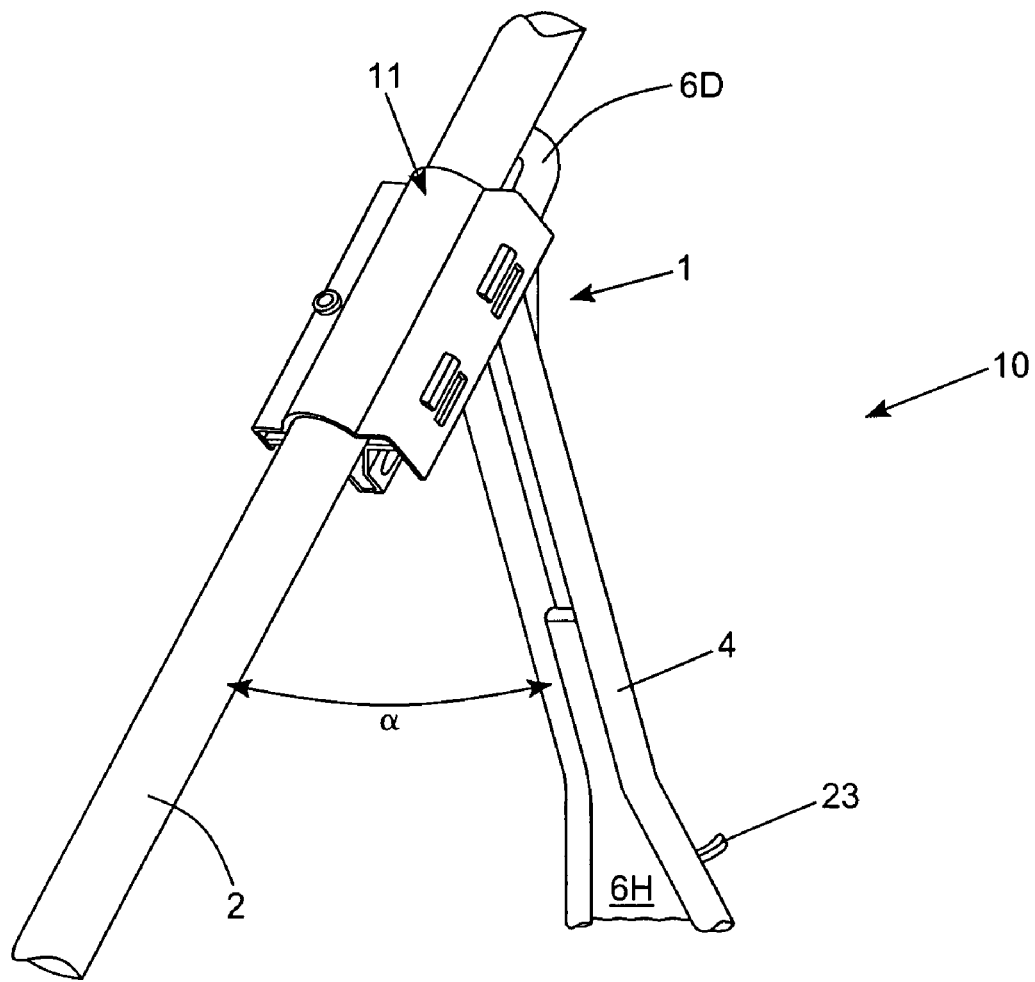
FIG. 3 is a third perspective, partially cut-away view of the reconfigurable garden tool caddy device of FIG. 1, showing its greater detail the mounting assembly affixed about the mid-section of the handle portion of the garden tool, and its hinged stand portion protracted away from the mounting assembly at an acute angle.
Figure 4:
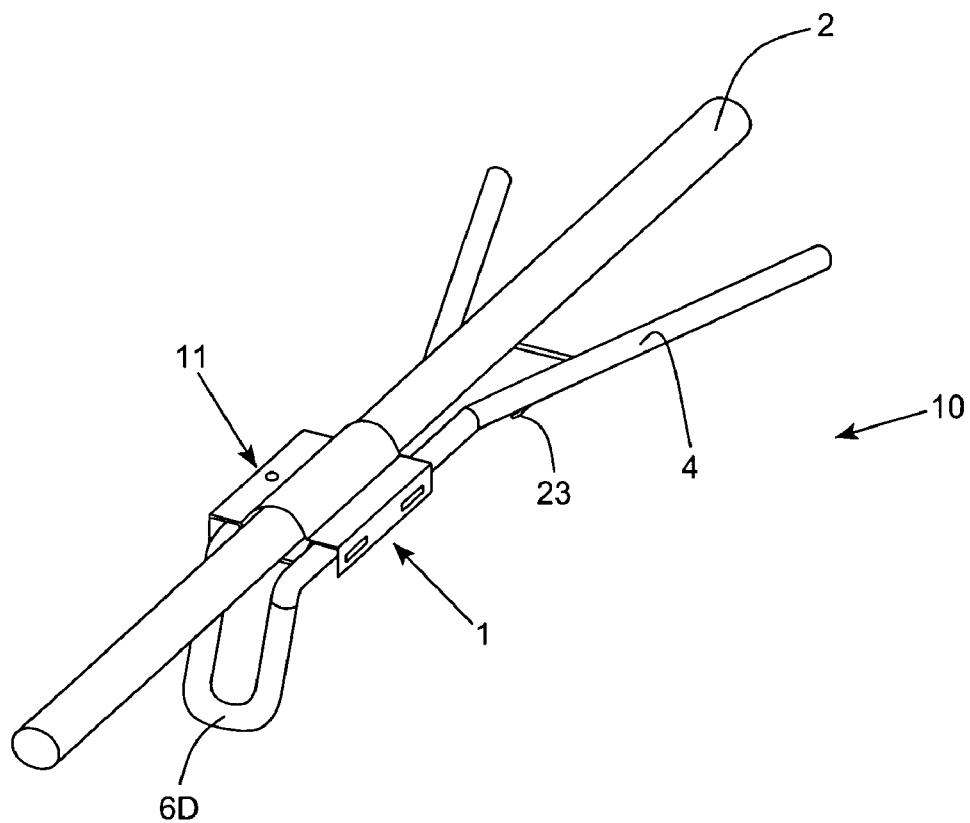
FIG. 4 is a first perspective view of the reconfigurable garden tool caddy device of the illustrative embodiment of the present invention, shown installed on a garden tool which is configured in its transport-work configuration with the hinged stand portion retracted within the stand retainer provided on the mounting assembly of the device, while being transported to a garden environment for use, and/or from a tool shed or other shelter where garden tools are kept from the natural elements when not in use.
Figure 5:
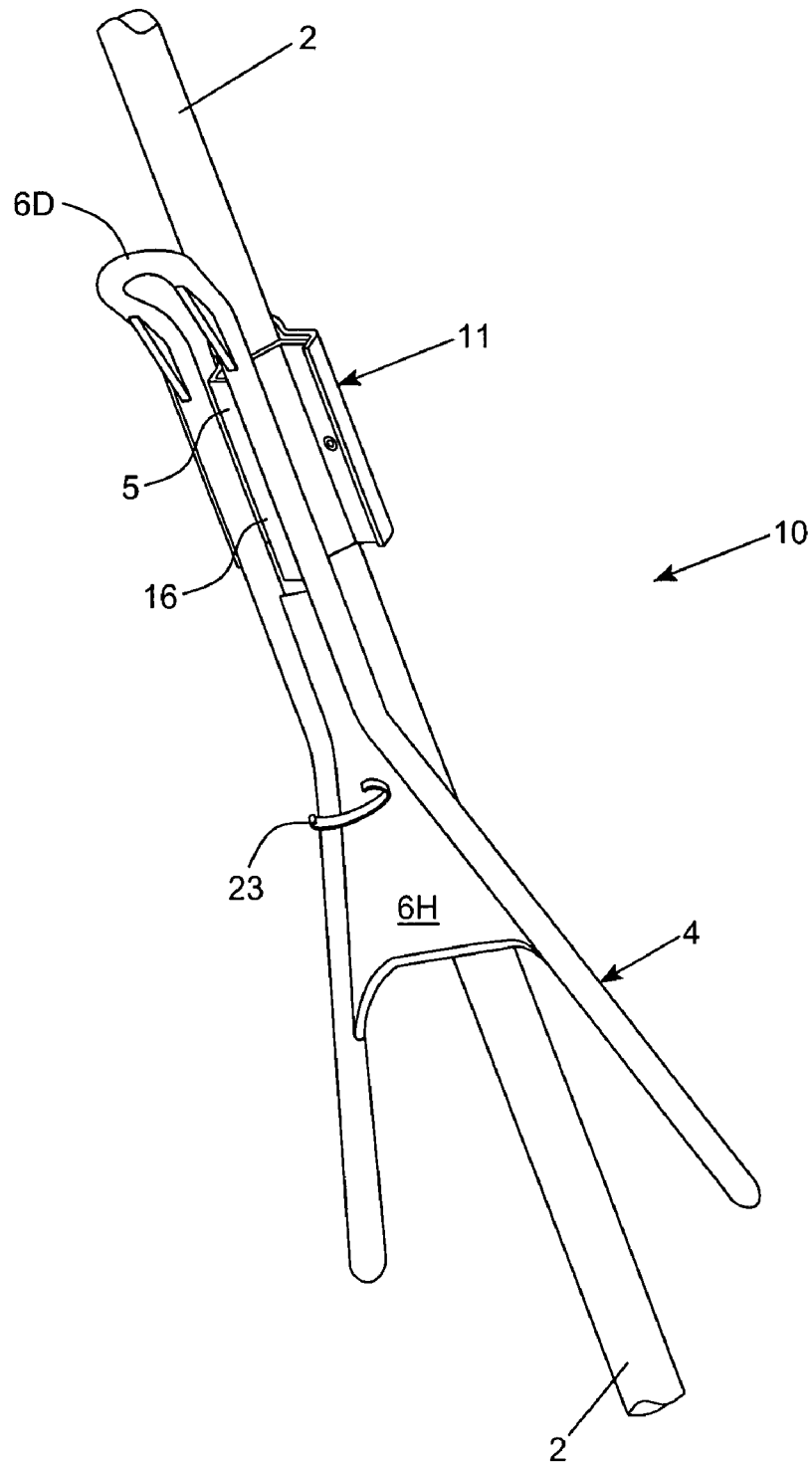
FIG. 5 is a second perspective view of the reconfigurable garden tool caddy device of the illustrative embodiment of the present invention, shown installed on a garden tool which is configured in its transport-work configuration with the hinged stand portion retracted within the stand retainer provided on the mounting assembly of the device.

As shown in FIGS. 2, 5 and 8, the interspacing between stand portion sections 6B and 6F is designed to be slightly narrower the outer thickness of the rectangular-shaped stand retainer 5 so that the stand retainer 5 simply snap-fits into the rectangular slot 16 formed between stand segments 6B and 6F during the transport-work configuration of the adapted garden tool, shown in FIGS. 4 through 7. Also as best shown in FIG. 2, the end segment 6D of the stand portion 4 has a semi-circular in geometry and is particularly adapted to engage with and support against the cylindrical handle portion 2 of the garden tool, slightly above the mounting position of the reconfigurable garden tool caddy device along the garden tool handle, when the adapted garden tool is arranged in its self-standing configuration as shown in FIGS. 1 through 3. In this self-standing configuration, the plane of the stand portion 4 is arranged at an acute angle with respect to the axis of the handle portion of the garden tool, and the angular spread of the diverging stand sections 6A and 6B provides a high degree of stability when the adapted garden tool of the present invention is supported on a rugged garden soil surface while configured in the self-standing configuration. In other embodiments of the present invention, the angular spread of the diverging tube sections of the stand portion 4, as well as the acute angle between the stand portion and the garden tool handle, may be greater or lesser than the angles shown in the illustrative embodiment of the present invention disclosed herein, without departing from the scope and spirit of the present invention.

Notably, the angle of inclination α of the garden tool handle can be adjusted by the position along which the device of the present invention is mounted along the handle portion of the garden tool. For tall individuals, it would be desirable to have the garden tool handle inclined a steeper (i.e. greater acute) angles β with respect to the garden ground surface, in which case the device should be mounted closer toward the working portion of the garden tool (e.g. near the hoe, rake or shovel portion of the tool), referred to as the distal end of the garden tool. For short individuals, it would be desirable to have the garden tool inclined a smaller (i.e. less acute) angles with respect to the garden ground surface, in which case the device should be mounted further away from the working portion of the garden tool (e.g. near the hoe, rake or shovel portion of the tool), referred to as the proximal end of the garden tool.

In FIG. 1 through 8, one design is shown for the mounting assembly of the reconfigurable garden tool caddy device of the present invention. However, it is understood that there are alternative designs for realizing this and the other components of the reconfigurable garden tool caddy device of the present invention.

Figure 9A:
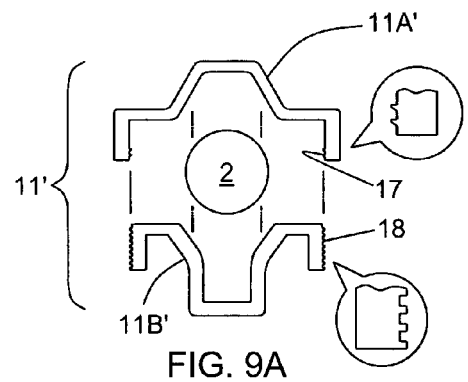
FIGS. 9A and 9B show first and second schematic representations of a first alternative design for the mounting assembly of the reconfigurable garden tool caddy device of the present invention, wherein the mounting assembly is shown embracing the handle portion of a garden tool having a small shaft diameter.
Figure 10A:
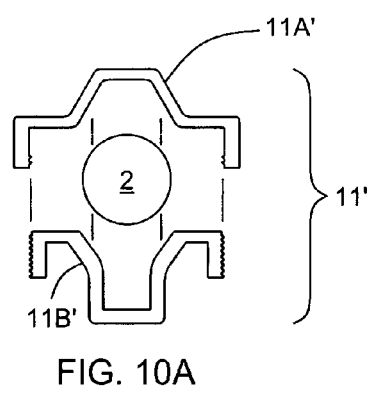
FIGS. 10A and 10B show first and second schematic representations of the first alternative design for the mounting assembly of the reconfigurable garden tool caddy device of the present invention, wherein the mounting assembly is shown embracing the handle portion of a garden tool having a large shaft diameter.
Figure 9B:
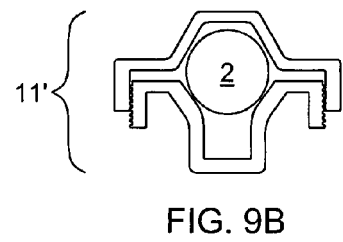
Figure 10B:
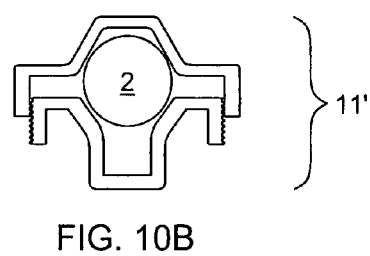

For example, as shown in FIGS. 9A through 10B, a second alternative mounting assembly design 11' is shown for the reconfigurable garden tool caddy device of the present invention. In this design, both sides of the first mounting portion 11A' and 11B' are provided with plural projections 17 on their inner edge surfaces and are adapted to be releasably engaged with plural corresponding grooves 18 formed on the outer edge surface of both sides of the second mounting portion 11B' when the first portion is pressed downward with a garden tool handle 2 disposed between the first and second mounting portion halves, as shown. As shown in FIGS. 9A and 9B, this design can easily mount to a handle 2 having a small shaft diameter, wherein FIGS. 10A and 10B show that the same design can easily mount to handles having a substantially large shaft diameter.

Figure 11A:
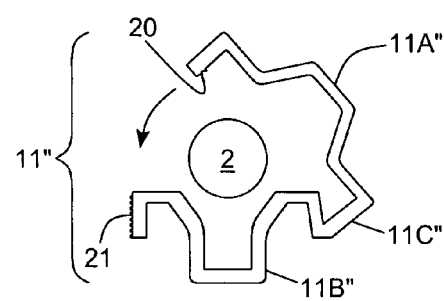
FIGS. 11A and 11B show first and second schematic representations of a second alternative design for the mounting assembly of the reconfigurable garden tool caddy device of the present invention, wherein the mounting assembly is shown embracing the handle portion of a garden tool having a small shaft diameter.
Figure 12A:
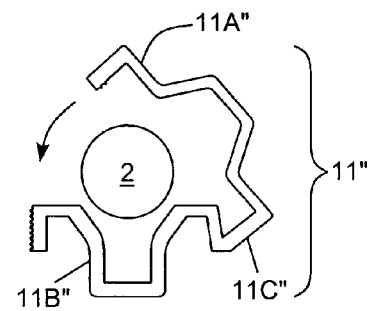
FIGS. 12A and 12B show first and second schematic representations of the third alternative design for the mounting assembly of the reconfigurable garden tool caddy device of the present invention, wherein the mounting assembly is shown embracing the handle portion of a garden tool having a large shaft diameter.
Figure 11B:
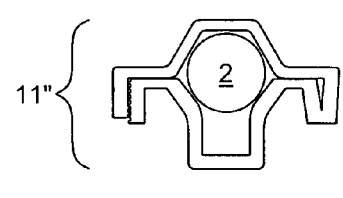
Figure 12B:
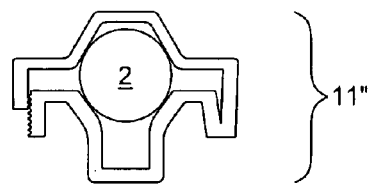

Also, as shown in FIGS. 11A through 12B, a third alternative mounting assembly design is shown for the reconfigurable garden tool caddy device of the present invention. In this design, one side of the first and second mounting portions 11A" and 11B" are hingedly connected together (e.g. by way of integral molding, mechanical hinges or like connection measures 11C"), while plural projections 18 are provided on its inner edge surface of first mounting portion 11A" and are adapted to be releasably engaged with plural corresponding grooves 12 formed on the outer edge surface of the second mounting portion 11B" when the first mounting portion 11A'" is pressed downward with a garden tool handle 2 disposed between the first and second mounting portions, as shown. As shown in FIGS. 11A and 11B, this design can easily mount to a handle having a small shaft diameter, wherein FIGS. 12A and 12B show that the same design can easily mount to handles having a substantially large shaft diameter.

Another important feature of the present invention is to provide a novel garden tool caddy system, wherein plural garden tools can be simply stacked and releasably-held together when each garden tool is provided with the reconfigurable garden tool caddy device of the present invention.

Figure 13A:
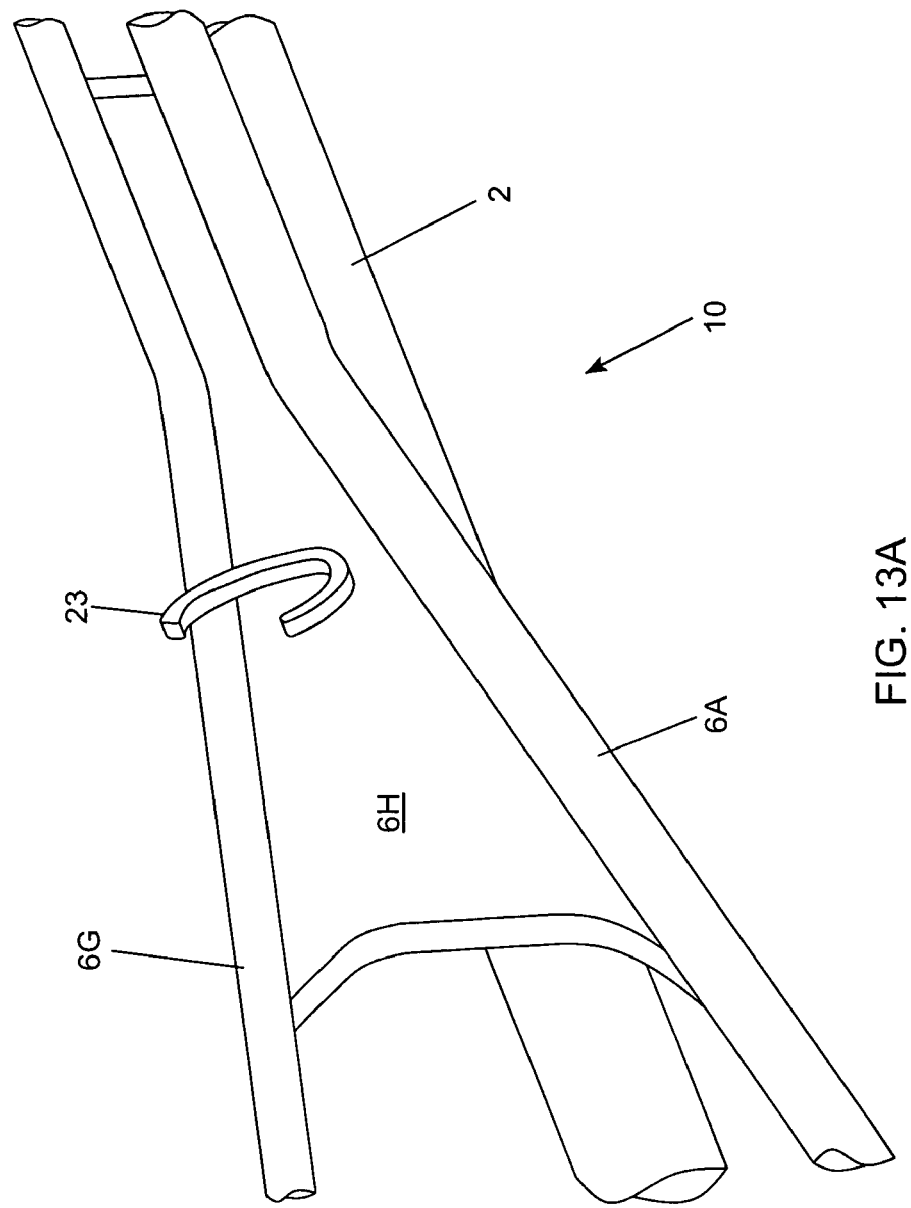
FIG. 13A is a perspective partially cut-away view of the handle clasping structure formed on the stand portion of the reconfigurable garden tool caddy device of the present invention, without the handle portion of a garden tool being shown clasped therein.
Figure 13B:
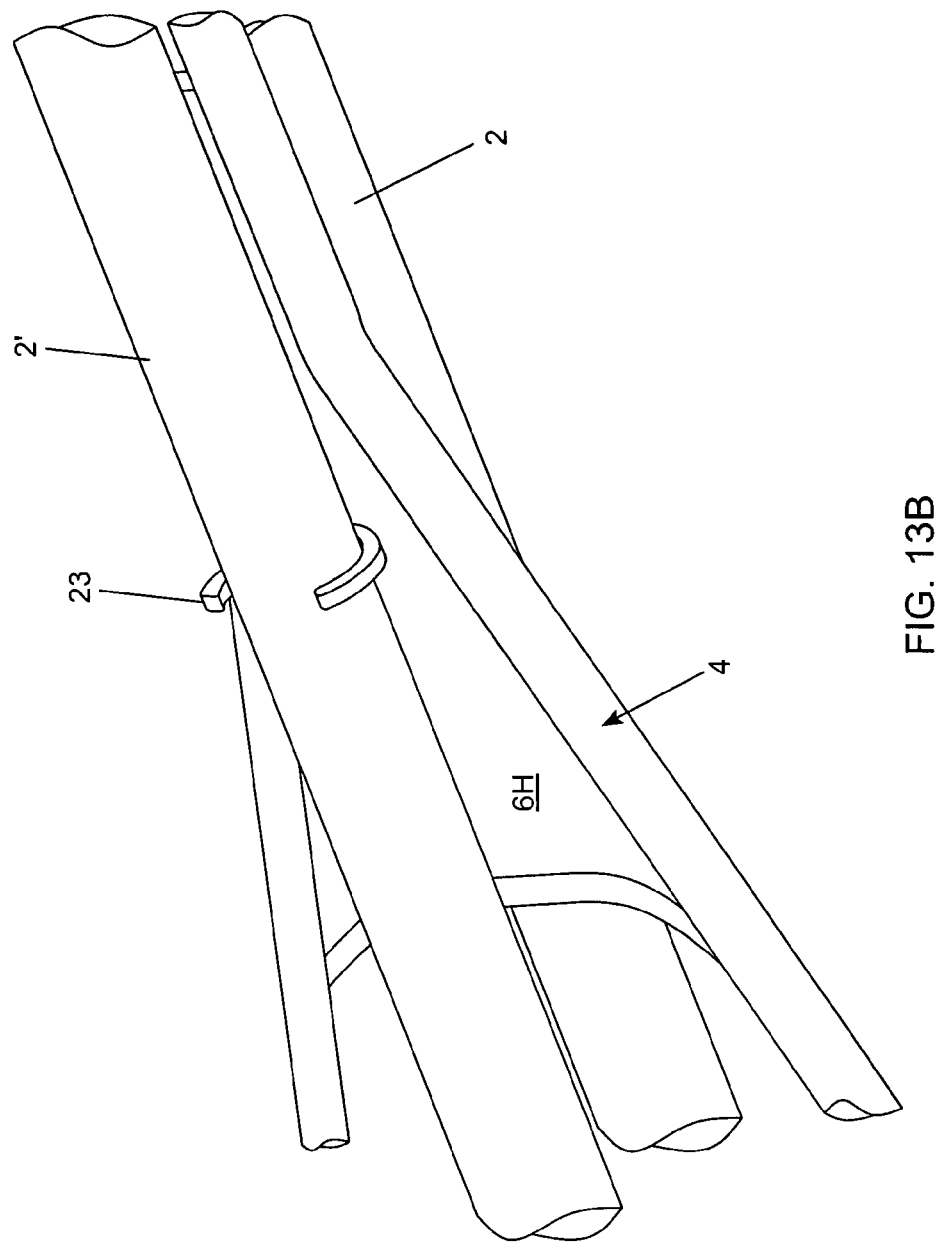
FIG. 13B is a perspective partially cut-away view of the handle clasping structure formed on the stand portion of the reconfigurable garden tool caddy device of the present invention, with the handle portion of a garden tool being shown securely and releasably clasped therein.

As best shown in FIG. 13A, a handle clasping structure 23 is formed on the stand portion of reconfigurable garden tool caddy device 1 and is adapted to securely yet releasably clasp the handle portion 2 of a garden tool, other than the garden tool to which its mounting assembly has been mounted, as shown in FIG. 13B. Preferably, the diameter of the handle clasping structure 23 is made slightly smaller than the smallest expect handle diameter of a garden tool with which the reconfigurable garden tool caddy device of the present invention can be used, and also, is made from a material having resilient properties to clasp a garden tool with sufficient strength that the tools will he held together as a single transportable unit, as shown in FIG. 13B, as well as in FIGS. 14 and 15.

Figure 14:
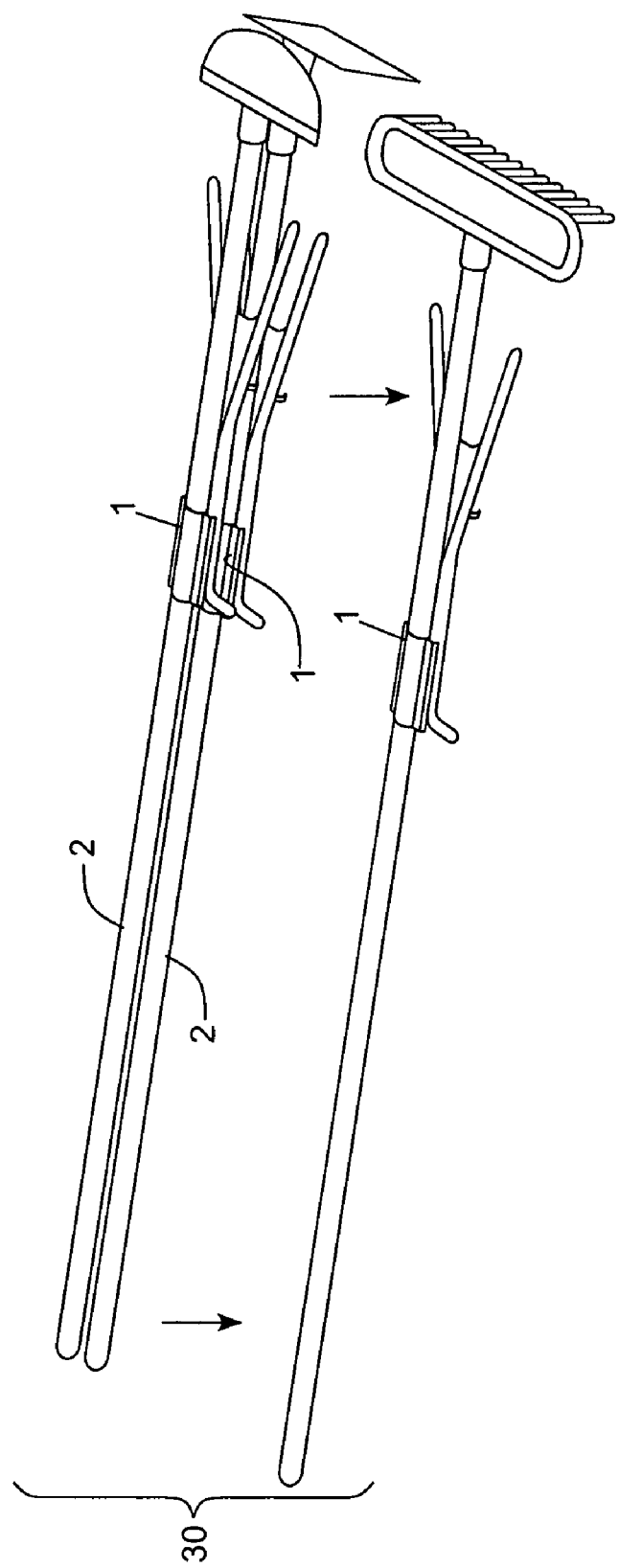
FIG. 14 is a perspective view of the garden tool caddy system of the present invention, wherein three long-handled garden tools are shown being stacked and bundled together, as a single hand-transportable unit, during the transport-work configuration, using three reconfigurable garden tool caddy devices of the present invention releasably stacked together by way of the handle clasping structure formed on the stand portion of each device.

As shown in FIG. 14, the garden tool caddy system of the first illustrative embodiment 30 comprises three long-handled garden tools being bundled together, as a single hand-transportable unit, during the transport-work configuration, using three reconfigurable garden tool caddy devices 1 of the present invention, releasably stacked together by way of the handle clasping structure 23 formed on the stand portion of each device.

Figure 15:
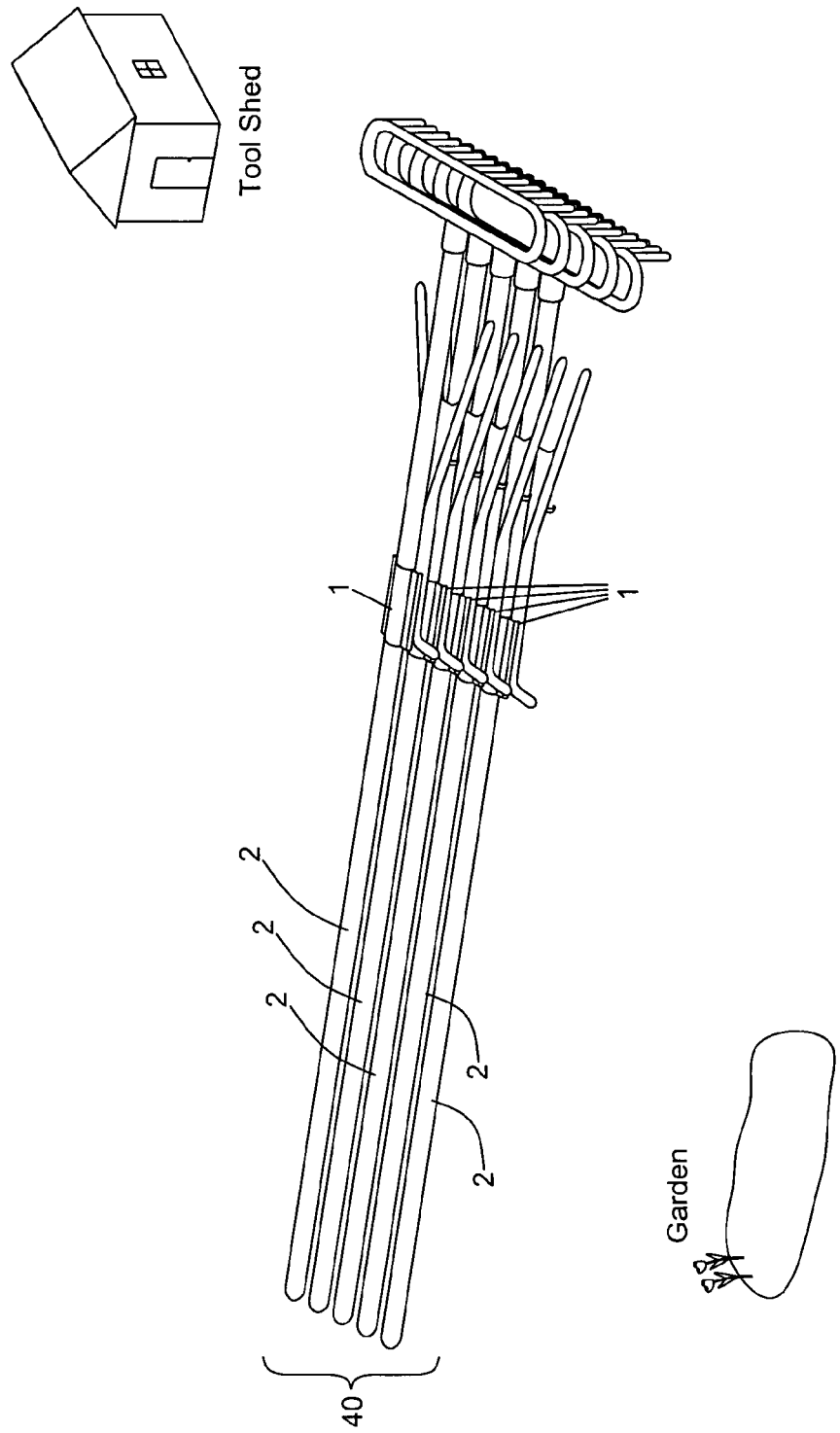
FIG. 15 is a perspective view of the garden tool caddy system of the present invention, wherein five long-handled garden tools are shown stacked and bundled together, as a single hand-transportable unit, during the transport-work configuration, using five reconfigurable garden tool caddy devices of the present invention releasably stacked together by way of the handle clasping structure formed on the stand portion of each device.

As shown in FIG. 15, the garden tool caddy system of the second illustrative embodiment 40 comprises five long-handled garden tools bundled together, as a single hand-transportable unit, during the transport-work configuration, using five reconfigurable garden tool caddy devices 1 of the present invention, releasably stacked together by way of the handle clasping structure 23 formed on the stand portion of each device.

Having described the garden tool caddy system of the illustrative embodiment of the present invention, it is now appropriate at this juncture to describe a preferred method of use, and gardening, in a practical user environment, with reference to FIGS. 16A1 through 16E.

As shown in FIG. 16A1, the first step of the method of the present invention involves stacking and bundling together the long-handled garden tools of the present invention, to form the garden tool caddy system of the present invention, as discussed above and shown in FIG. 13A through 14, and then releasably mounting the garden tool caddy system up against and on the vertical wall surface 40 of a garage, tool shed or other shelter, by way of a support post 30 mounted on the wall surface by a fastening mechanism 31 (e.g. screws, adhesive, Velcro® fasteners, etc). As shown in FIG. 16A2, when the garden tool caddy system is mounted on the wall surface, the clasping hook 23 of the garden tool, closest to the wall surface 40, will releasably engage and be supported upon the support post 30 mounted on the wall surface.

As shown in FIG. 16A3, the second step of the method involves removing the garden caddy system from its mounting position against the wall surface, and this is achieved by lifting the clasping hook 23 of the garden tool, closest to the wall surface 40, off and disengaging from the support post 30 mounted on the wall surface.

Figure 16B:
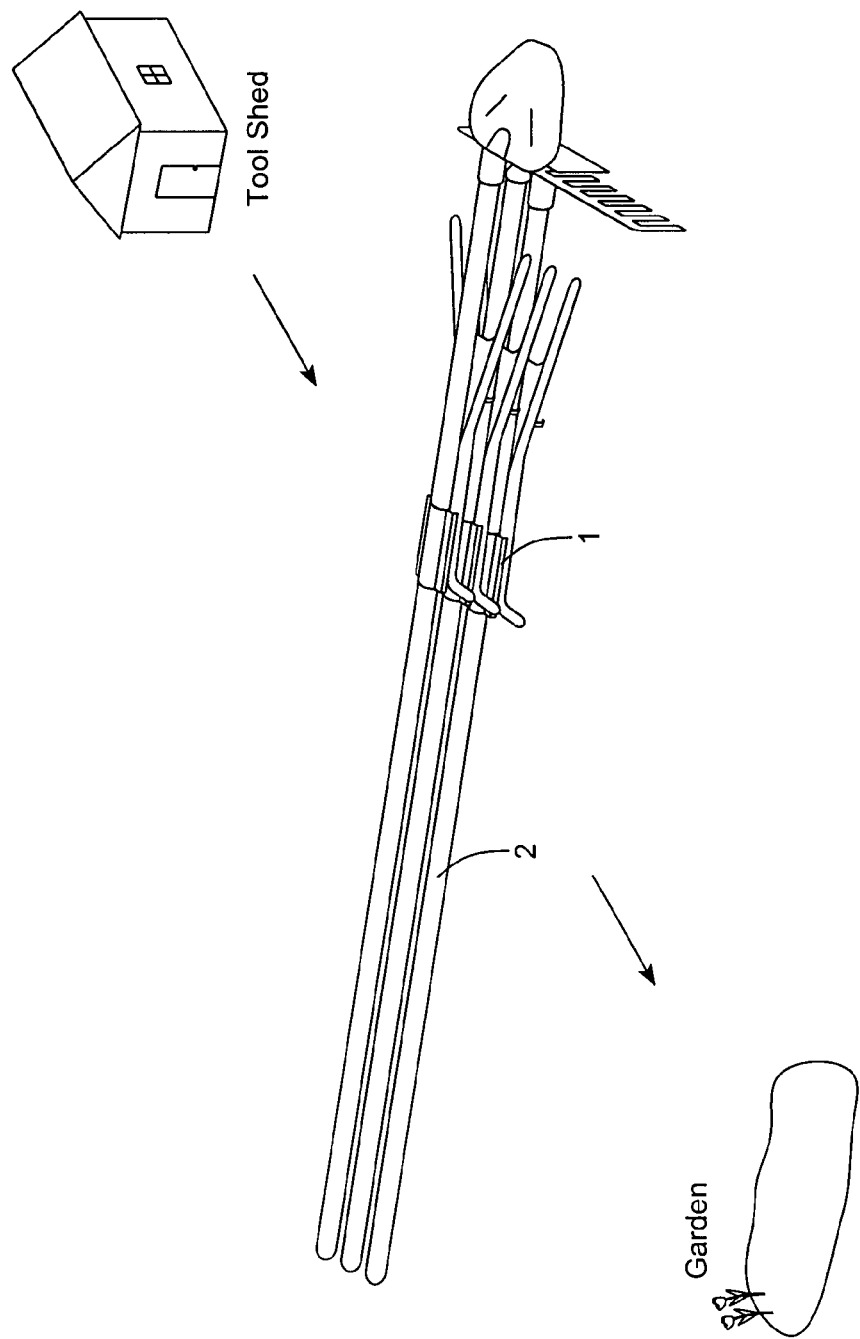
FIG. 16B is a perspective view of the garden tool caddy system illustrated in FIGS. 16A1 through 16A3, shown removed from the wall surface of FIG. 16A3, with its components stacked and bundled together as a single hand-transportable unit, during the transport-work configuration, and being transported from a tool shed or other shelter to a garden environment in accordance with the principles of the present invention.

As shown in FIG. 16B, the third step of the method involves transporting the garden tool caddy system (in the transport-work configuration) from a tool shed or other shelter to a garden environment.

Figure 16C:
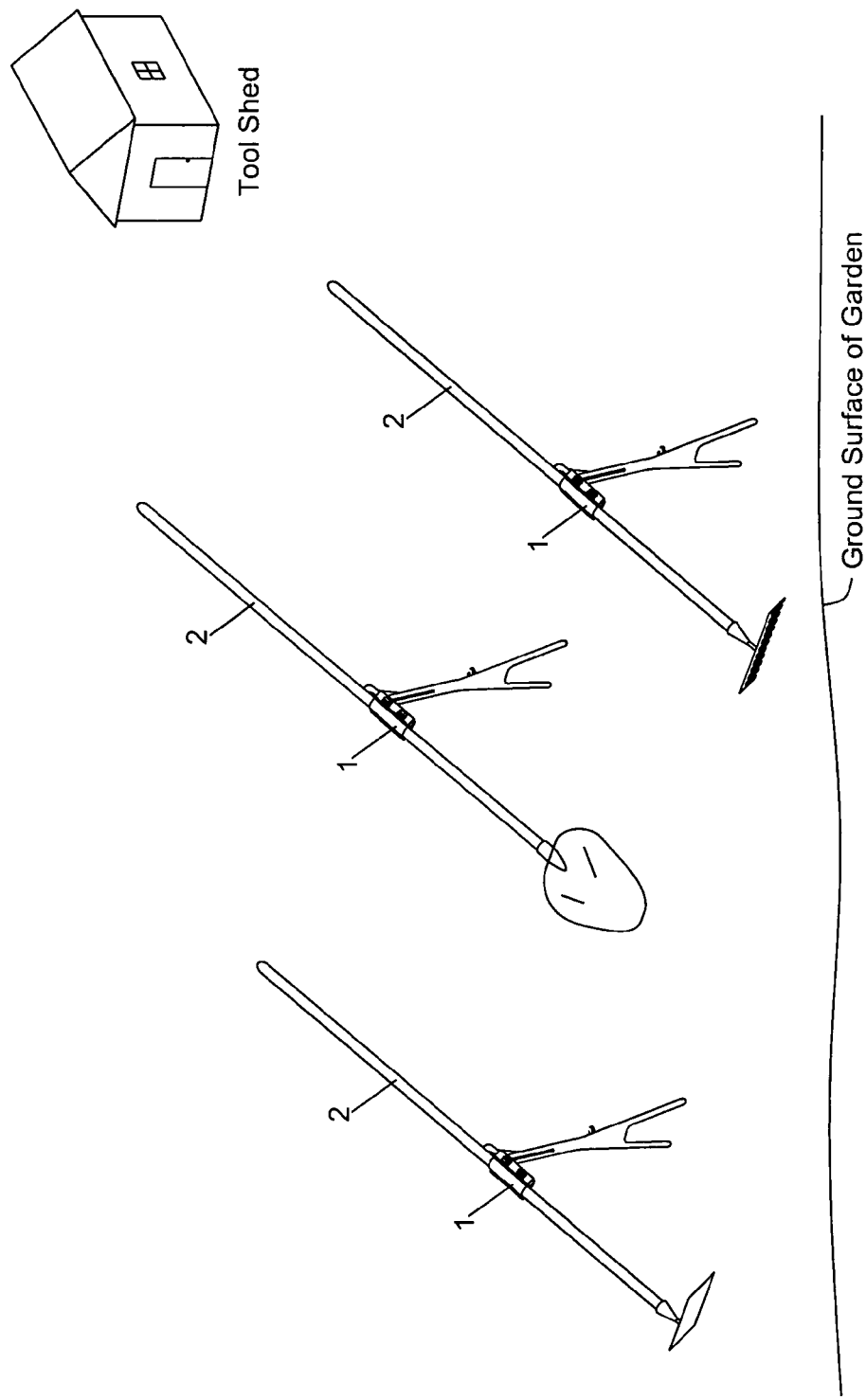
FIG. 16C is a perspective view of the garden tool caddy system illustrated in FIGS. 16A1 through 16B, shown disassembled into its components, wherein each individual garden tool of the present invention is used in the garden environment, and arranged in its self-standing configuration, in accordance with the principles of the present invention.

As shown in FIG. 16C, the fourth step of the method involves disassembling the garden tool caddy system into its components, so that each individual garden tool of the present invention can be used in the garden environment, and arranged in its self-standing configuration, in accordance with the principles of the present invention.

Figure 16D:
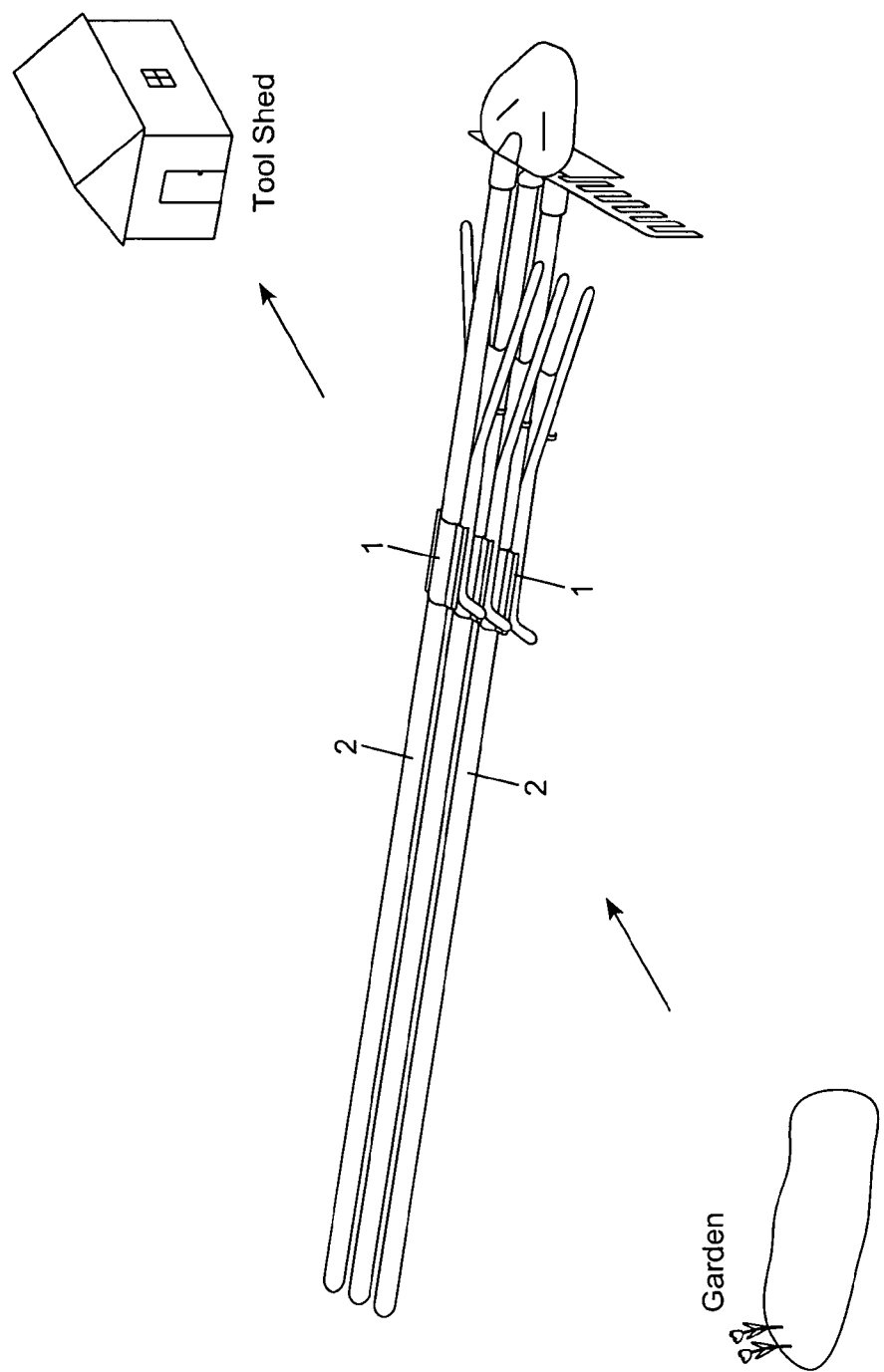
FIG. 16D is a perspective view of the garden tool caddy system illustrated in FIGS. 16A1 through 16C, shown with its components stacked and bundled together as a single hand-transportable unit, during the transport-work configuration, and being transported from the garden environment back to the tool shed or other shelter in accordance with the principles of the present invention.

As shown in FIG. 16D, when gardening activities are completed, the fifth step of the method involves stacking and bundling together the garden tools of the present invention together, as shown in FIG. 14, so that they are arranged as a single hand-transportable unit, in the transport-work configuration, and can be transported from the garden environment back to the tool shed or other shelter for storage.

As shown in FIGS. 16E1 through 16E3, the sixth and final step of the method involves supporting the garden tool caddy system, as a single hand-transportable unit, back up against the wall surface 40 of the garage, tool shed or storage shelter, by way of the support post 30 mounted on the wall surface, as illustrated in FIG. 16A2, in particular.

By virtue of the method of the present invention, a plurality of otherwise cumbersome long-handled garden tools can be adapted to form part of a reconfigurable garden tool caddy system, which can be conveniently stored, as a single hand-transportable unit, on the wall surface of a garage, tool shed or other storage shelter. Then when the garden tools are to be used in the garden, the garden tool caddy system can be simply dismounted within seconds and toted across the yard in hand or aboard a wheelbarrow, and into the garden where the system is quickly disassembled into its individual garden tool components, each of which has a self-standing configuration, and can function as a separate caddy, in accordance with the principles of the present invention. Finally, when gardening activities are done, the individual garden tool components can be quickly snapped together to form the garden tool caddy system which, as a single hand-transportable unit, can be simply toted back across the yard, in ones hand or in a wheelbarrow, to the garage, tool shed or storage shelter, as the case may be, where the garden tool caddy system can be remounted on the wall surface, as a single hand-transportable unit, within seconds, for convenient storage.

Having the benefit of the present disclosure, variations and modifications to the illustrative embodiments of the present invention will readily come to mind.

For example, the stand portion of the present invention can be made in the form of many different shapes provided it is capable of supporting the weight of the garden tool, and provides the required stability in indoor and outdoor garden environments so that the garden tool does not easily tip over due to gravitational loading, wind currents, and other natural elements.

Figure 6:
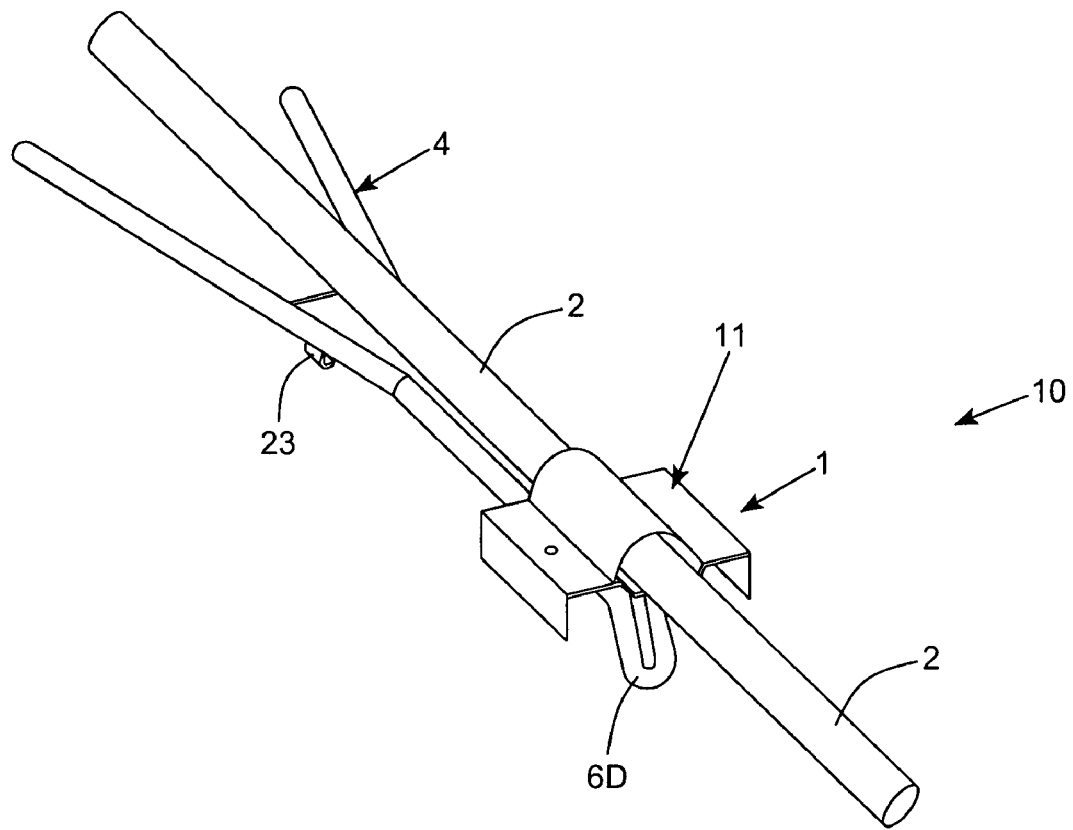
FIG. 6 is a third perspective view of the reconfigurable garden tool caddy device of the illustrative embodiment of the present invention, shown installed on a garden tool which is configured in its transport-work configuration with the hinged stand portion retracted within the stand retainer provided on the mounting assembly of the device.
Figure 7:
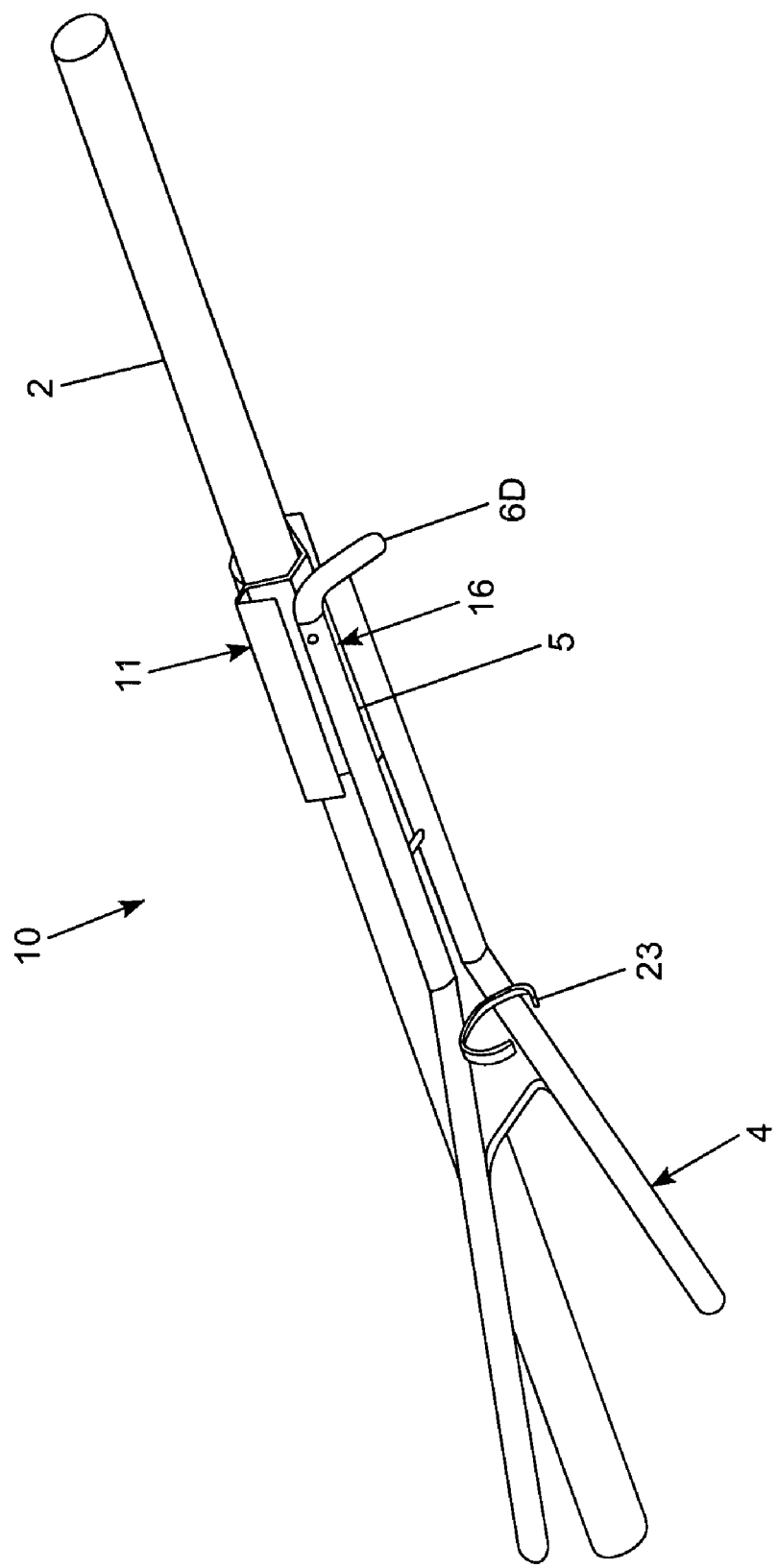
FIG. 7 is a fourth perspective view of the reconfigurable garden tool caddy device of the illustrative embodiment of the present invention, shown installed on a garden tool which is configured in its transport-work configuration with the hinged stand portion retracted within the stand retainer provided on the mounting assembly of the device.

Also, the stand retainer mechanism employed in the device of the present invention can also be realized in various ways, other than the snap-fit mechanism shown in FIGS. 5, 6 and 7. Such alternative mechanisms can include spring-biased mechanisms, catch and release type mechanisms, and other releasable fastening mechanism well known in the art.

The stand portion 4 and the mounting assembly 11, and enabling structures including 11A and 11B, can also be provided with other clips and holding structures to securely hold small hand tools (e.g. trowels), a MP3 music player (e.g. iPod® Shuffle device), miniature AM/FM radio, a water bottle, and other small tools and articles which gardeners frequency carry with them to the garden.

In such applications of the present invention, the first mounting portion 11A of the device might also bear the brand logo and symbols of the tool accessory provider or manufacturer, and functioning as a valuable form of brand marketing communication.

In addition, the geometrical structures of the reconfigurable garden tool caddy device of the present invention, as well as the proximal end of the garden tool handle itself, can be provided with plastic ornamental covering (e.g. affixed to the mounting portion 11A and/or stand portion 4) so as make the garden tool of the present invention resemble the primary ornamental feature of a wildlife creatures that inhabit the great outdoors, providing pleasure and/or amusement to children and adults alike. For example, the stand portion of the device may be made to resemble the legs of a giraffe, whereas the mounting portion 4 resembles the giraffe's body with colorful skin texturing, while the proximal end of the garden tool handle can be provided with a rubberized head portion of the giraffe, transforming an ordinary garden tool into a self-standing wildlife creature, which even the most serious of gardeners might enjoy.

The reconfigurable garden tool caddy device of the present invention should be of great value to gardening enthusiasts who wish for the convenience and added value that the device of the present invention brings to consumers in the marketplace.

These and all other such modifications and variations are deemed to be within the scope and spirit of the present invention as defined by the accompanying Claims to Invention.

What is claimed is:

1. A method of using a plurality of long-handled garden tools during gardening operations, wherein each said long-handled garden tool has a handle portion which can be held by a gardener working soil in a garden having a ground surface, said method comprising the steps of:

(a) mounting a reconfigurable garden tool caddy device to the handle portion of each of a plurality of long-handled garden tools, wherein each said long-handled garden tool has a distal working end and a proximal end closet to the gardener so that said long-handle garden tool is provided with a transport-work configuration and a self-standing configuration, and each said reconfigurable garden tool caddy device including:

a mounting assembly adapted to embrace the handle portion of said long-handled garden tool at a selected distance away from the distal working end of said long-handled garden tool, and including a stand retainer structure; and a stand portion hingedly connected to said mounting assembly and capable of being configured (i) in a first arrangement during said transport-work configuration, so that said stand portion is disposed closely adjacent said handle portion and is releasably retained by said stand retainer so that the garden tool can be either transported or used to work the soil of said garden, and (ii) in a second arrangement during said self-standing configuration, so that said stand portion is arranged at a first acute angle with respect to the handle portion of said long-handled garden tool and supports said garden tool in an upright position at a second acute angle with respect to the ground surface of the garden; and a handle clasping structure formed on said stand portion, for securely and releasably clasping the handle portion of another garden tool different from the garden tool to which said reconfigurable garden tool caddy device is mounted;

wherein when said long-handle garden tool is arranged in said transport-work configuration, said long-handled garden tool is capable of being transported or used to work the soil of the garden; and wherein when said long-handled garden tool is arranged in said self-standing configuration, said long-handled garden tool is capable of being supported on the ground surface of the garden in an upright position at an inclined angle with respect to said ground surface of the garden for the convenience and safety of the gardener;

(b) stacking and bundling together said plurality of long-handled garden tools so as to form the garden tool caddy system, wherein said stacking and bundling together said plurality of long-handled garden tools is achieved by said handle clasping structure formed on said stand portion, securely and releasably clasping the handle portion of one said long-handled garden tool different from the long-handled garden tool to which said reconfigurable garden tool caddy device is mounted;

(c) releasably mounting said garden tool caddy system up against and on a vertical wall surface of a garage, tool shed or other shelter, by way of a support post mounted on said wall surface by a fastening mechanism, wherein when said garden tool caddy system is mounted on said wall surface, the handle clasping structure of the garden tool, closest to the wall surface, is releasably engaged and supported upon the support post mounted on the wall surface;

(d) removing the garden caddy system from its mounting position against the wall surface, by lifting the clasping hook of the garden tool, closest to the wall surface, off and disengaging from the support post mounted on the wall surface;

(e) transporting the garden tool caddy system in the transport-work configuration, from a tool shed or other shelter to a garden environment;

(f) disassembling the garden tool caddy system into its components, so that each individual garden tool can be used in the garden environment, and arranged in its self-standing configuration;

(g) when gardening activities are completed, stacking and bundling together the garden tools together, so as to configure said garden tool caddy system as a single hand-transportable unit, and transporting said garden tool caddy system from the garden environment back to the tool shed or other shelter for storage; and (h) supporting the garden tool caddy system, as a single hand-transportable unit, backed up against the wall surface of the garage, tool shed or storage shelter, by way of the support post mounted on the wall surface.

2. The method of claim 1, wherein step (e) comprises transporting said garden tool caddy system across the yard in hand or aboard a wheelbarrow, and into the garden; and step (f) comprises transporting said garden tool caddy system across the yard in hand or aboard a wheelbarrow, and to the garage, tool shed or storage shelter.

* * * * *